July 17, 1934.  H. H. WENNEBORG  1,966,574
ARTIFICIAL KNEE JOINT
Filed Jan. 30, 1933
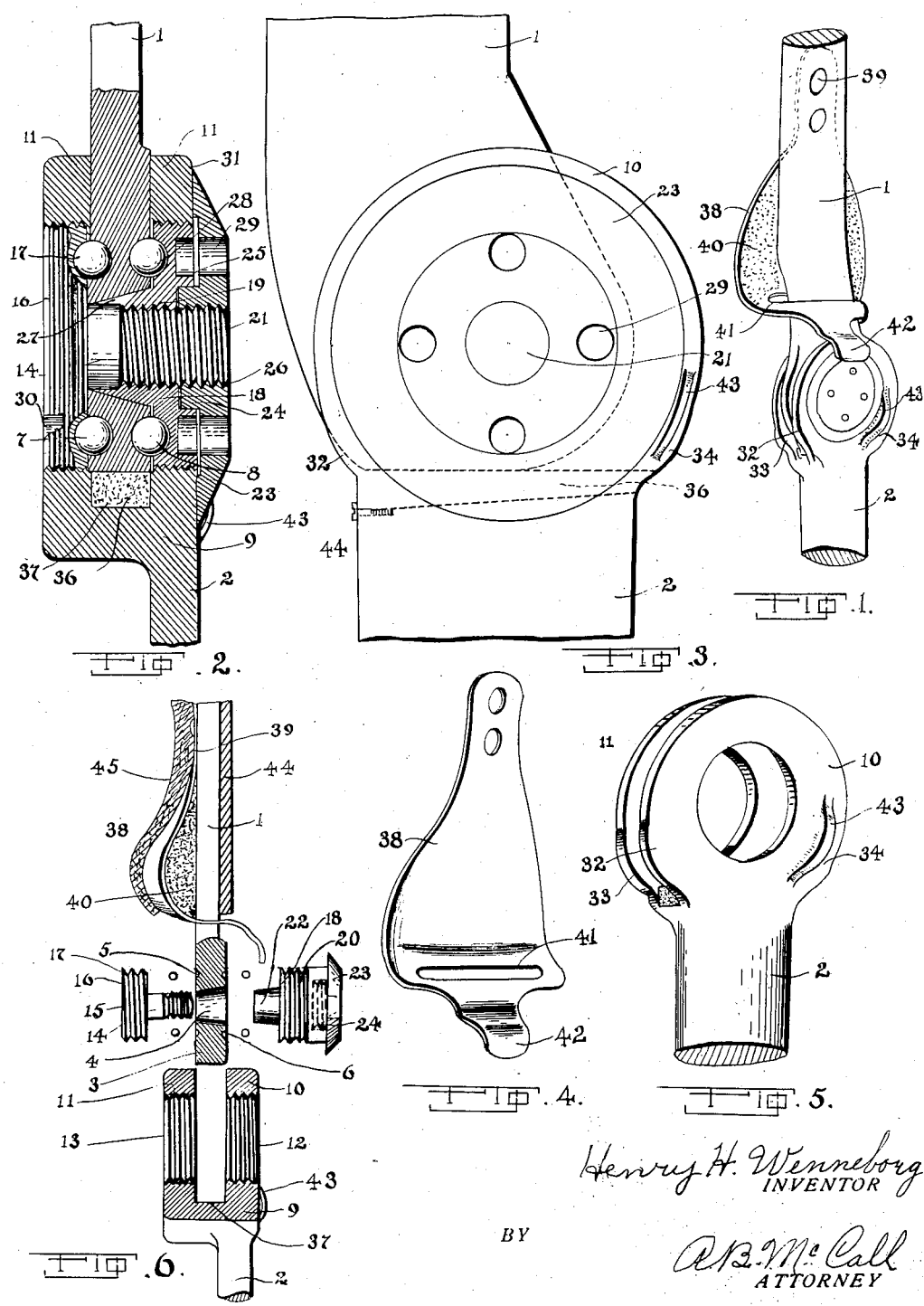

Patented July 17, 1934

1,966,574

UNITED STATES PATENT OFFICE 1,966,574

ARTIFICIAL KNEE JOINT

Henry H. Wenneborg, Springfield, Ill.

Application January 30, 1933, Serial No. 654,191

8 Claims. (Cl. 3—2)

My invention relates to artificial limbs and more particularly to improvements in the knee structure of an artificial leg; an object being in my invention to provide a more practical knee joint and the means operatively connected therewith for holding the artificial leg comfortably in place and when in operation to prevent the joint from chewing the clothing or making a metallic clicking noise as the joint functions.

A further purpose of my invention is to provide a combination of cooperating mechanical improvements in the knee structure of an artificial leg which will result in a dependable joint operation; a comfortable gripping of the wearer's leg at the side of the knee when in standing position and automatic releasing of the grip when taking a sitting position; the protection of clothing from becoming pinched in the joint and a cushioned resistance in the joint to eliminate metallic clicking thereof.

I attain the objects of my invention by the improved features of an artificial leg described in the annexed specification, recited in the claims and illustrated in the accompanying drawing in which like reference numerals indicate like parts in the several figures.

Referring to the figures:

Figure 1 is a perspective of one of the knee structures of my invention which are adapted to operate in pairs.

Figure 2 is a vertical half section of the ball-bearing joint forming one of the essential features of my invention.

Figure 3 is a side view of the ball-bearing knee joint shown in Figure 2.

Figure 4 is a perspective of the resilient spring member operatively secured to the upper shank member and controlled by the action of the ball-bearing joint.

Figure 5 is a perspective of the yoke member of the ball-bearing knee joint defining the upper terminal of the lower shank member.

Figure 6 is a detailed section of the knee structure of my invention showing the operative relation of the several parts thereof.

Referring in detail to the preferred construction of my invention and the manner of operating the same I provide as improvements in knee structure of artificial legs an upper shank member 1 operatively pivoted to a lower shank member 2 through an adjustable ball-bearing joint having a decidedly novel and practical construction which materially improves the wearing comfort, convenience and practicability of the knee joint structure of an artificial leg.

The real merits of this adjustable ball-bearing knee joint will be readily observed when the details thereof are studied and compared with certain well-known ball-bearing joints commonly found in use on the market.

For instance in this ball-bearing knee joint the upper shank 1 has its lower terminal 3 provided with a tapered or cone-shaped hole 4 and annular recess 5 on one side and 6 on the other to provide a ball race for balls 7 on one side and 8 on the other. Yoke member 9 has yoke arms 10 and 11 respectively provided with threaded holes 12 and 13 and defining the upper terminal of shank 2.

This ball-bearing joint includes features which make it quite convenient to make necessary adjustment to tighten up the fittings after they become worn somewhat.

By observing the manner of assembly of this joint the merits thereof will become evident.

For instance when assembling the joint terminal member 3 of shank 1 is inserted into yoke 9, between yoke arms 10 and 11. The balls 7 are set into ball race 5 of terminal 3 and bolt 14 is then inserted through tapered hole 4 and threads 15 of the bolt head 16 are screwed into the threaded hole 13 of yoke arm 11 until ball race 17 of bolt head 16 comes into contact with balls 7 to hold them in place.

After bolt 16 is screwed into operative position then balls 8 are inserted into ball race 6 of shank terminal 3 and the threaded cone-shaped sleeve 18 is screwed on to bolt shank 14 by the internal threads 19 of the sleeve while at the same time the threaded head 20 of sleeve 18 screws into threads 12 of yoke arm 10; since the internal and external threads of sleeve 18 effectively worked together in size and pitch thus causing sleeve 18 to properly engage threads 12 at the same time that it engages threads 21 of bolt 16.

Thus when sleeve 18 is screwed down to the point where it engages balls 8 then cone tip 22 of sleeve 18 snuggly fits into cone-shaped 4 of shank terminal 3 permitting shank terminal 3 to pivotally move thereon.

Sleeve 18 is provided with an end recess about threaded shank 21 of bolt 16. A lock nut 23 is provided with a central shank 24 adapted to fit down into central recess 25 of sleeve 18 when the internal threads 26 of lock nut 23 engage threaded shank 21 of the bolt 16. This lock nut thus has a tendency to hold sleeve 18 from becoming loose and yet when the cone tip 22 becomes slightly worn sleeve 18 may be moved to permit tip 27 of the cone portion to be slightly filed off so that sleeve 18 may thus be made to take up the play that existed in the worn joint.

It will be observed that sleeve 18 may be screwed into place by means of a pin wrench adapted to fit into holes 28 thereof while lock nut 23 may be adjusted by a similar wrench engaging wrench holes 29 and bolt 16 may be turned into place by the same wrench operating in wrench holes 30 in the bolt head. When lock nut 23 is secured in place resting against the outer face 31 of yoke arm 10 it then pulls on bolt 16 as well as to provide a protection for sleeve 18. Thus the ball-bearing joint is made practical, durable and adjustable for the purpose intended and with other details of its construction it accomplished more.

For instance yoke arms 10 and 11 are provided with eccentric raised portions 32, 33, 34, and 35 (35 not shown but corresponding in position with 34 on the yoke arm 11) for the purpose of holding clothing up away from contact with the terminal 3 of shank 1 keep the clothing from getting caught in the joint.

A cushioning wedge 36 of preferably fiber or raw hide is inserted at the base 37 of yoke 9 so as to provide a means of preventing a metallic click during the operation of the joint as the shank members 1 and 2 are moved into a position of upright alignment and is held in place by a screw 44.

A spring member 38 is secured by rivets 39 or other fastening means to shank 1 and provided with a padding 40 of cotton or wool or other suitable padding of material having limited resilient resistance between spring 38 and shank 1 to provide more uniform resistance for the spring. A slot 41 through which shank 1 extends, enables spring member 38 to reach with its free end around to the outside of shank 1 and extend a terminal clip 42 out over the edge of yoke arm 10.

When in normal use spring 38 exerts a resilient pressure against the sides of the wearer's knee just above the knee joint, in which operative position the spring has a tendency to hold an effective resistance against an undesired slipping of the artificial leg when in use.

But when the person wearing the artificial leg sits down that springy pressure is not needed. I therefore provide as an integral portion of yoke arm 10 a cam 43 which when shank 1 is moved down to a sitting position of the wearer has a tendency to lift clip 42 of spring 38 as clip 42 moves down about the joint. When clip 42 is thus lifted the result thereof is to relieve the pressure of spring 38 from against the sides of the wearer's knee at a time when such pressure is not needed.

It will be noted in connection with my invention that I provide as one of the novel features of construction thereof a side joint at the knee structure having its locking arrangement so constructed, as will be observed from study of the drawing, that when the lock nut is turned to lock the adjustable ball bearing joint for operation the lock nut pulls on the shank of the bolt while it pushes on the lip of the lower shank while the lip in turn pushes on the sleeve and the sleeve in turn exerts a pressure on the bolt shank toward the head thereof thus locking the operating parts of the ball bearing joint which hold the members in place to the lower shank leaving the lower end of the upper shank free to move with the extra freedom afforded by the aid of the balls of such an adjustable ball bearing joint. It is thus impossible to force the lips of the lower shank fork or yoke portion of the joint out of true parallel alignment while adjusting or locking the joint.

Within the scope of my invention it will be noted that I provided a preferably leather covering 44 for shank member 1 and on the inside of shank 1 a lacer portion 45 of this covering is shaped to receive a resilient padding which with the covering and lacer portion thereof defines a flexible pocket or resilient padding forming an inward enlargement of the covering adapted to aid in holding the artificial leg in place by exerting a light pressure against the sides of the natural knee.

It will be observed that I provide an organization defining an improved artificial knee structure which is practical, substantial, and comfortable and wholly within the range of economical manufacture.

Having thus described the nature of my invention what I claim is:

1. The combination in an artificial knee joint comprising upper and lower shank members, adjustable ball-bearing joints therefor, a cushioned stop member for the joints, form fitting and padded spring members on said upper shanks for engaging the side of the human leg above the knee joint, a cam on the outer side of said joints and an integral extension lip on said spring, registering for control by said cam for releasing the spring, from pressure against the side of the leg, and said joint having eccentric raised portions on its periphery for preventing clothing from catching in the joint.

2. In an artificial leg having upper and lower shank members the combination with an adjustable ball-bearing joint connecting said shank members, of a cushioned wedge stop member within the yoke of the joint to prevent metallic sounds when the knee joint functions, resilient spring members secured to the upper shank members by one end and resiliently padded between the spring and shank; said spring having a slot through which the shank extends and provided with a terminal clip for a cam adjustment thereof; said lower shank member provided at the joint yoke thereof with eccentric members adapted to prevent clothing from getting caught in said joint and said yoke members of said lower shank provided with an integral side cam for automatically lifting said spring by its terminal clip when said shank members are turned at approximately right angles to relieve said spring from its pressure against the sides of the knee when the person wearing the artificial limb assumes a sitting position.

3. In an artificial leg having upper and lower shank members connected by an adjustable ball-bearing knee joint, and said joint having the yoke member thereof on the lower shank provided with integral peripherial raised portions to guard clothing from the joint, an integral side cam and a detachable cushioning wedge member within the yoke base portion; a resilient spring member secured to the upper shank member on the inner side by one end and provided with a slot through which said shank extends, an integral terminal clip on said spring registering with and adapted to be lifted by said integral side cam of the joint when said yoke members are moved to a position at right angles to each other and a cushioning filler between said spring body and said upper shank.

4. In an artificial leg having upper and lower shank members and padded resilient spring stop members operatively secured to the upper shank members for aiding in holding said artificial limb in place, knee joint members comprising as the adjacent pivotally connected terminals of said shank members a rounded bar terminal for the upper shank provided with a hole through the pivot end defining a cone-shaped perimeter thereof and provided on each side with annular recesses defining a ball race, a yoke defining the upper terminal of the lower shank, threaded holes on each arm of the yoke, a threaded bolt having a threaded head adapted to engage the threads of one arm of the yoke and provided with an annular recess co-operating with said recess of the upper shank terminal defining a ball race, and the shank of the bolt extending through the joint, a cone-shaped and threaded sleeve engaging said bolt shank and registering within said cone-shaped hole of the upper shank member fitting in said yoke; said sleeve having a flanged threaded head for screw adjustment in said yoke and engaging said bolt shank and provided with a central end recess, and an annular recess on the side next to said corresponding recess of the upper shank terminal also to define a second ball race, a lock nut threaded for screw engagement of said bolt and provided with a central shank registering within said recess of said sleeve and an outer flange of the lock nut engaging said yoke about the threaded hole in the yoke, integral peripherial raised portions on said yoke members to prevent pinching the wearer's pants leg in said joint, a cushioning wedge within said yoke base at the end of said upper shank member as a resilient stop member to prevent metallic clicking of the joint, and the outer member of said yoke provided with an integral cam for automatically lifting the free terminal clip of said spring member when the person wearing the leg assumes a sitting position for releasing said spring pressure from the sides of the knee which the spring engages when in a standing position.

5. In an artificial leg having a retaining corset and an artificial shank member, an upper shank provided with a retaining spring member fixed thereto at one end of the spring; said spring intermediate its ends shaped to define a resilient pocket in conjunction with the lower end of the corset member and lower part of upper shank covering; thus to provide a resilient pressure on the sides of the knee of the natural leg when the wearer is in standing position, an adjustable joint operatively connecting and a lower shank defining a knee action with said upper shank and means connected with said joint for automatically releasing said spring on the upper shank from its resilient pressure against sides of the natural knee when a sitting position is assumed.

6. In an artificial leg having lower shank and a pivotal knee joint, an upper shank secured at said pivot and provided with a covering whose lower terminal is shaped to receive resilient padding between the covering and the shank to define a flexible pocket at the lower end of the shank covering, to facilitate holding the artificial leg in operative position for normally exerting a light pressure against the side of the natural knee.

7. In an artificial leg having upper and lower shank members connected by a ball bearing joint that is adjustable, and a bolt having a threaded head and threaded shank, a sleeve provided with a central conical projection, an internally threaded extension head opposite the conical projection and an annular recess defining about the cone portion a ball race; said lower shank having its joint end forked with threaded holes through the arms thereof, one of said arms adapted to receive the threaded head of the bolt and the other the threaded extension head of the sleeve the upper shank member provided with a conical hole through the bottom end for receiving the cone shaped portion of the sleeve; said internal threads of the sleeve made exactly in true turn with the external threads of the head thereof, a lock nut provided with a central threaded hole for engaging the bolt shank thread, a central projection of the lock nut and an end recess in said sleeve adapted to receive said lock nut projection; said lock nut further provided with an annular recess under the head thereof adapted to provide clearance for said sleeve.

8. In an artificial leg having a retaining corset and a retaining spring and an upper shank operatively secured thereto, a lower artificial shank member pivotally connected with the upper shank member at the knee positions; said upper shank terminating at the lower end in a round shape having a conical hole therethrough and a circular recess defining a ball race on each side adjacent said hole; said lower shank having its upper end forked for receiving the upper shank between the arms of the fork; said arms having a threaded hole through each with the threads of each cut in exactly true turn to each other, a bolt having a threaded head for one of said fork arms and the shank thereof extending through said conical hole of the upper shank and defining an anchoring pin for the joint a retaining sleeve having a conical center portion with a threaded head for engaging the threads of the fork not engaged by the bolt head and inner threads establishing screw connections with threads on said bolt shank in true turn with the threads of the fork engaged by the head of the sleeve; said sleeve and said bolt head provided with annular recesses cooperating with said ball races of the upper shank in the joint for retaining the ball bearing of the joint and a lock nut provided with central threads operatively engaging said threads of said bolt shank and provided with an annular flange portion engaging the outer surface of said fork of the lower shank member; said fork of said lower shank at the knee joint provided with an integral cam for automatically releasing said spring on the upper shank from pressure against the side of the natural knee when a sitting position is assumed and further provided with eccentric raised portions about its periphery to hold clothing away from contact with said joint causing pinching thereof; said fork provided at its base with a tapered wedge of rawhide or fiber and the like to prevent metallic clicking between the adjacent terminals of said shanks in the joint; and means for holding said wedge within operative position.

HENRY H. WENNEBORG.